United States Patent [19]

Pogorzelski et al.

[11] Patent Number: 5,445,242

[45] Date of Patent: Aug. 29, 1995

[54] DISC BRAKE CALIPER WITH AUXILIARY SYSTEM TO COOL BRAKE FLUID

[76] Inventors: Thomas J. Pogorzelski, S88 W26040 Edgewood Ave.; Kevin B. Sinnett, W273 S8555 Hillview Dr., both of Mukwonago, Wis. 53149

[21] Appl. No.: 112,606

[22] Filed: Aug. 27, 1993

[51] Int. Cl.6 ............................................. F16D 65/853
[52] U.S. Cl. ........................... 188/71.6; 188/264 CC; 192/113.3
[58] Field of Search ............ 188/71.1, 71.6, 264 D, 188/264 CC, 264 P, 264 F, 274, 264 G; 192/70.12, 113.3

[56] References Cited

U.S. PATENT DOCUMENTS

| | | | |
|---|---|---|---|
| 1,972,353 | 9/1934 | North et al. | 188/72 |
| 2,821,272 | 1/1958 | Sanford et al. | 188/264 |
| 2,889,897 | 6/1959 | Sanford et al. | 188/264 D |
| 3,028,935 | 4/1962 | Gold et al. | 188/71.6 X |
| 3,420,342 | 1/1969 | Botterill | 188/264 |
| 3,915,262 | 10/1975 | Klaue | 188/71.6 |
| 3,941,219 | 3/1976 | Myers | 188/71.6 X |
| 4,014,410 | 3/1977 | Bryant | 188/71.6 |
| 4,077,500 | 3/1978 | Hickman, Sr. et al. | 188/264 FX |
| 4,147,241 | 4/1979 | Pieniczny et al. | 188/264 G |
| 4,706,459 | 11/1987 | Burckhardt | 60/562 |
| 4,799,575 | 1/1989 | Kroniger | 188/71.6 |
| 4,815,573 | 3/1989 | Miyata | 188/264 F |
| 5,009,291 | 4/1991 | Castellano | 188/71.6 |

FOREIGN PATENT DOCUMENTS

| | | | |
|---|---|---|---|
| 1903437 | 8/1970 | Germany | 188/71.6 |
| 3902788 | 8/1990 | Germany | 188/264 G |
| 159431 | 6/1990 | Japan | 188/71.6 |
| 1097841 | 6/1984 | U.S.S.R. | 188/71.6 |

*Primary Examiner*—Robert J. Oberleitner
*Assistant Examiner*—Alfred Muratori
*Attorney, Agent, or Firm*—Godfrey & Kahn

[57] ABSTRACT

A disc brake caliper with auxiliary system to cool brake fluid for use in a high performance automobile includes a brake caliper (12) and a cooling system (14). The brake caliper (12) has a housing (34), a first conduit (60), and a second conduit (74). The first conduit (60) conveys a hydraulic fluid to first and second bores (48, 50), whereby pistons received within the bores (48, 50) may be activated to press friction pads (22, 26) against a rotor (16) and provide a braking action. The second conduit (74) conveys a coolant through the housing (34) to a region proximal the first conduit (60). The cooling system (14) comprises the second conduit (74), a pump (94), and a radiator (96) connected in series via connective plumbing (92) to form a fluid circuit. The pump (94) forces coolant to flow through the circuit such that heat is exchanged from the hydraulic fluid to the coolant in the region of the housing (34) where the first conduit (60) and the second conduit (74) are proximal, conveyed by the coolant to the radiator (96), and transferred out of the cooling system (14) through the radiator (96) to the surrounding environment.

9 Claims, 3 Drawing Sheets

DISC BRAKE CALIPER WITH AUXILIARY SYSTEM TO COOL BRAKE FLUID

FIELD OF THE INVENTION

The present invention relates to a disc-brake caliper for use in high performance or racing-type overland vehicles. More particularly, the present invention relates to such a disc-brake caliper which incorporates a mechanism for cooling actuating fluid.

BACKGROUND OF THE INVENTION

Disc brakes in high performance or racing-type overland vehicles are subject to conditions of frequent and demanding use. As a consequence, the hydraulic or actuating fluid may become heated to a point where it may lose some of its properties of power transference. Under such circumstances, the brakes may fail and the safety of the driver, as well as other drivers, may be compromised.

There are a number of prior-art, disc-brake caliper cooling devices. Some of the prior-art cooling devices are designed to cool the friction elements of the disc-brake calipers by an auxiliary cooling system. Such devices are illustrated in U.S. Pat. Nos. 1,972,353; 3,915,262; and 4,815,573 which issued to North et al., Klaue, and Miyata, respectively. These designs do not address heating of the actuating fluid directly, and in brakes of this type catastrophic heating of the brake fluid may still occur.

Other prior-art devices cool the actuating fluid by adding cooling means directly to the hydraulic circuit. In such a design, a failure of the cooling means may prevent the brakes from operating properly since the brakes and the cooling means are a part of the same system. Additionally, the incorporation of a cooling means in the hydraulic circuit may be unduly complex or introduce other technical difficulties into the brake system.

Accordingly, a need has developed for a disc brake caliper wherein auxiliary cooling of the actuating fluid occurs, thereby avoiding the aforementioned difficulties. In particular, there is a need for a disc-brake caliper wherein the disc-brake fluid is cooled and such cooling is independent of the hydraulic circuit which actuates the brakes.

OBJECTS AND SUMMARY OF THE INVENTION

Therefore it is an object of the present invention to provide a disc-brake caliper wherein the actuating fluid is cooled.

A further object of the present invention is to provide a disc-brake caliper wherein the disc-brake actuating fluid is cooled by a system which is independent of the hydraulic circuit.

A further object of the present invention is to provide a disc-brake caliper particularly suited for use in a high-performance or racing-type overland vehicles in which the actuating fluid may be especially susceptible to high temperatures.

These and other objects and advantages are achieved in a disc-brake caliper of the present invention including a main body, a first conduit, and a second conduit. The main body is defined by an outside boundary and has an opening which includes a first inwardly facing surface and a second inwardly facing surface. The main body is secured on the automobile such that a rotor which is rotated simultaneously with a wheel hub of the automobile is positioned in the opening and the first inwardly facing surface and the second inwardly facing surface axially oppose each other relative to the rotation of the rotor. The main body further has a first bore located on the first inwardly facing surface and a second bore located on the second inwardly facing surface. Each of the bores are adapted to receive a piston which is activated simultaneously with the piston in the other bore to press a friction pad against the rotor and thereby clamp the rotor therebetween to provide a braking action against the rotor.

The first conduit conveys an actuating fluid to the first and second bores such that the pistons are activated upon flow of the actuating fluid through the first conduit. The second conduit conveys a coolant through the main body to a region proximal the first conduit, whereby heat is conducted away from the actuating fluid upon flow of the coolant directed through the second conduit. The second conduit includes a groove formed in the outside boundary of the main body and which is proximal to the first conduit. This structure facilitates the conduction of heat away from the actuating fluid upon forced flow of a coolant through the cooling system.

The second conduit, a pump, and a radiator are connected in fluid flowing relation by connective plumbing to form a fluid circuit. The pump forces coolant to flow through the circuit such that heat is exchanged from the actuating fluid to the coolant where the second conduit is proximal to the first conduit, and is thereafter conveyed by the coolant to the radiator where the heat is subsequently transferred out of the cooling system by means of the radiator to the surrounding environment. The pump maintains continuous flow through the fluid circuit.

The present invention also incorporates fins, heat shields, insulative air gaps, and a design to improve air venting to assist in the cooling of the disc-brake caliper, generally.

Further objects, features, and advantages of the invention will be apparent from the following detailed description when taken in conjunction with the accompanying drawings.

DETAILED DESCRIPTION OF THE PREFERRED EMBODIMENT

Figure 1:
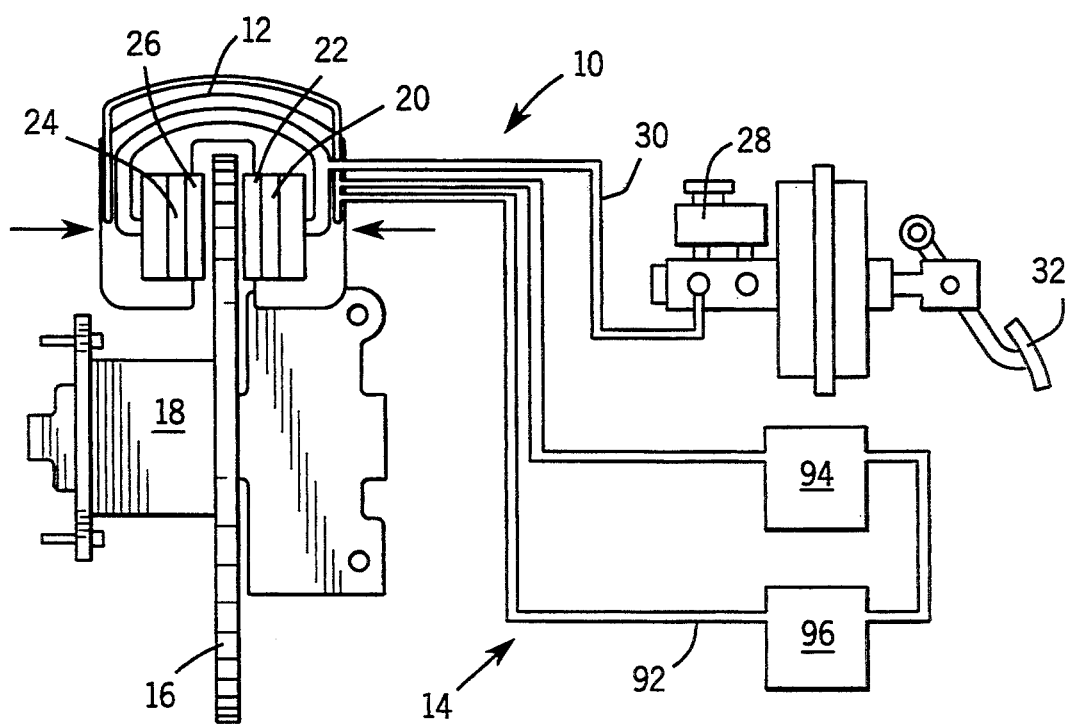
FIG. 1 is a simplified block diagram showing the disc-brake caliper of the present invention as connected by hydraulic lines to the master cylinder, and the auxiliary system to cool actuating fluid including the pump and the radiator.
Figure 2:
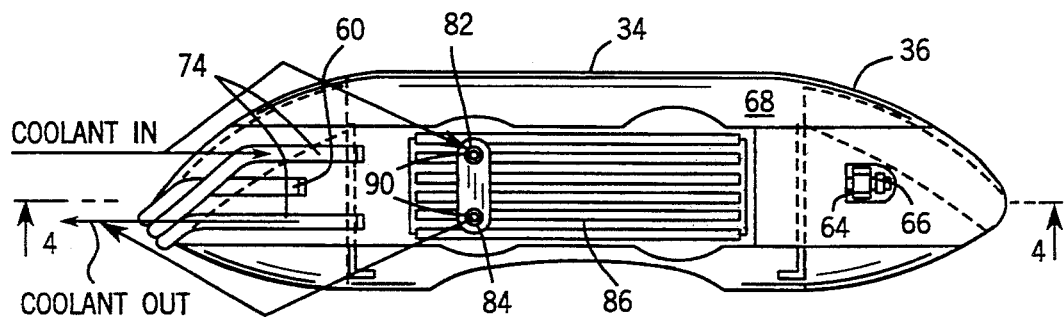
FIG. 2 is a side elevation view of the disc-brake caliper of the present invention.

With reference to the drawings, a disc-brake actuating fluid cooling system is shown generally at 10 in FIG. 1. The disc-brake actuating fluid cooling system 10 includes a disc-brake caliper 12 and a radiator system 14. The disc-brake caliper 12 is utilized in an overland vehicle, and in particular, it is utilized in a high-performance or racing-type automobile. The disc-brake caliper has a rotor 16 which is simultaneously rotated with a wheel hub 18 and includes a first piston unit 20 which terminates in a friction pad or pads 22 and a second piston unit 24 which terminates in a friction pad or pads 26. The piston unit 20 and the piston unit 24 may include one or more pistons. The description that follows illustrates a case in which the piston unit 20 and the piston unit 24 are of a dual piston arrangement, that is, each unit includes two pistons.

The disc brake caliper 12 is hydraulically operated through a master cylinder 28 which supplies actuating fluid under pressure to the disc brake caliper 12 through connective plumbing 30. When a brake pedal 32 is depressed by an operator of the automobile, pressure in the actuating fluid is transmitted to the piston units 20 and 24. The piston units 20 and 24 are on opposite sides of the rotor 16 and activated simultaneously toward the rotor 16. In this regard, the piston unit 20 presses the friction pad or pads 22 against one side of the rotor 16, and the piston unit 24 presses the friction pad or pads 26 against the other side of the rotor 16. The movement of the friction pad or pads 22 and 26 is generally indicated by the arrows in FIG. 1. The pressing of the friction pads 22 and 24 against the rotor 16 provides a braking action against the rotor 16 to stop the rotor 16 from turning. The structure and function of disc brakes are generally well-known and understood in the art, and a general description of disc brakes is omitted herein for the sake of brevity.

Figure 4:
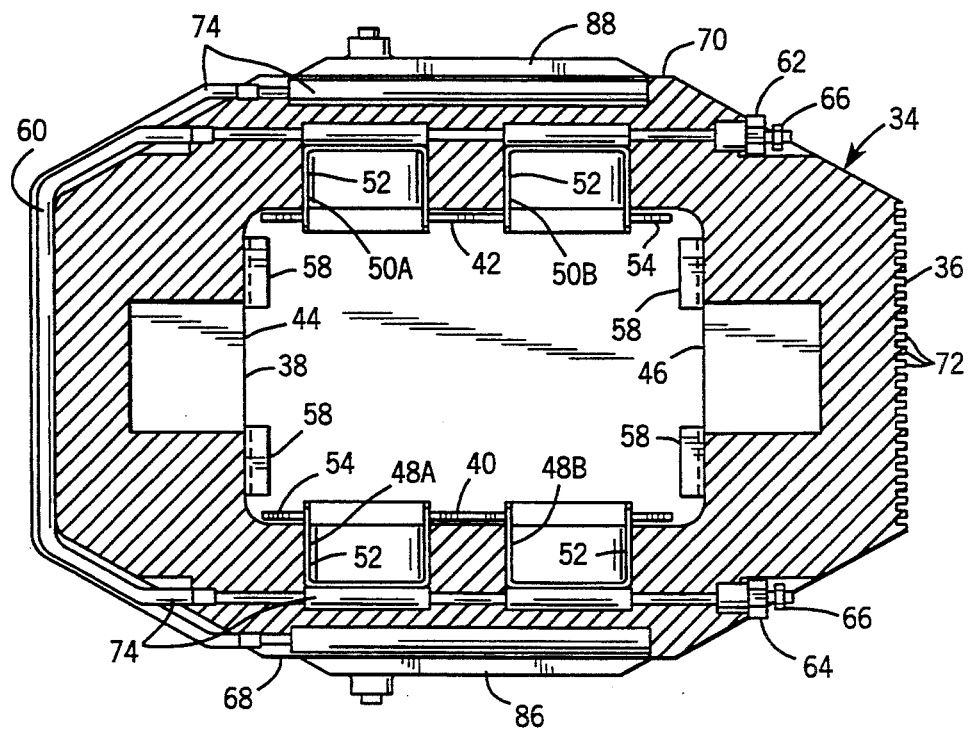
FIG. 4 is a longitudinal, cross-sectional view, taken from a position along line 4—4 of FIG. 2 of the disc-brake caliper of the present invention.
Figure 5:
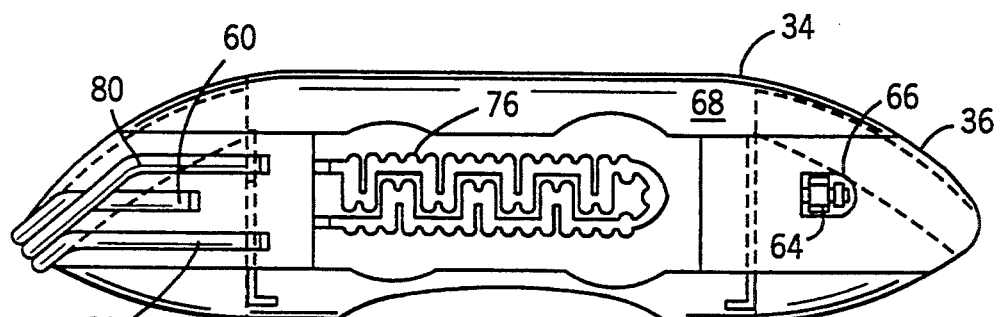
FIG. 5 is a side elevation view of the disc-brake caliper of the present invention such as shown in FIG. 2, with the end plate removed to show the means to cool the brake fluid in more detail.
Figure 3:
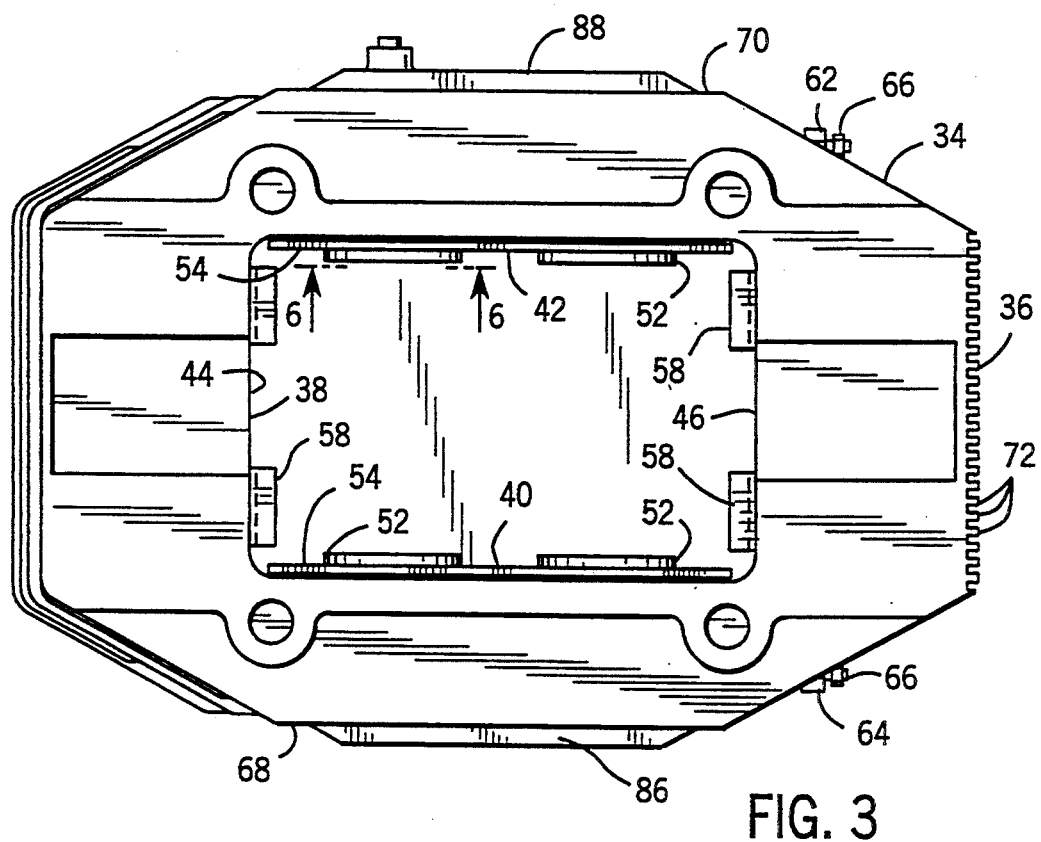
FIG. 3 is a top plan view of the disc-brake caliper of the present invention.
Figure 6:
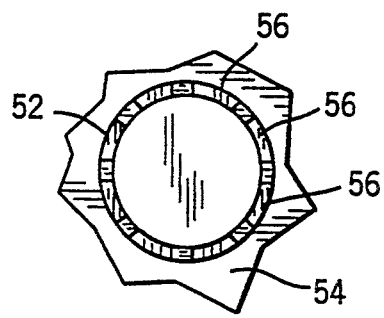
FIG. 6 is a fragmentary, side elevation view of the present invention taken from a position along line 6—6 of FIG. 3.

The disc-brake caliper 12 of the present invention is shown generally in FIGS. 2-6. The disc-brake caliper 12 includes a main body 34 which is defined by an outside boundary 36. As best seen in FIGS. 3 and 4, the main body 34 has an opening 38 which includes a first inwardly facing surface 40, a second inwardly facing surface 42, a third inwardly facing surface 44, and a fourth inwardly facing surface 46. The first and the second inwardly facing surfaces 40 and 42, respectively, are substantially parallel and opposed to each other. The main body 34 is adapted to be secured to the automobile such that the rotor 16 is positioned in the opening 38 and further such that the first inwardly facing surface 40 and the second inwardly facing surface 42 are in axial opposition to each other relative to the rotation of the rotor 16. The third and the fourth inwardly facing surfaces 44 and 46, respectively, are substantially parallel and opposed to each other, and substantially perpendicular to the first and the second inwardly facing surfaces 42 and 44 respectively.

The first inwardly facing surface 40 has a pair of bores 48A and 48B (collectively, the bores 48) formed therethrough. Likewise, the second inwardly facing surface 42 has a bore 50A and a bore 50B (collectively, the bores 50) formed therethrough. Each of the bores 48A, 48B, 50A, and 50B extends a partial distance into the housing 34. Further, each of the bores 48A, 48B, 50A, and 50B include a cylindrical sleeve 52 which matingly fits therein. Each of the bores 48A, 48B, 50A, and 50B and its associated cylindrical sleeve 52 is further adapted to movably receive a piston. The bores 48 receive the piston unit 20 and the bores 50 receive the piston unit 24. The pistons in the bores 48 are activated simultaneously with the pistons in the bores 50. Upon such activation, the pistons press friction pads against the rotor 16, thereby clamping the rotor 16 therebetween and providing a braking action against the rotor 16. The preceding description presumes that there are two sets of bores and associated pistons in opposition to each other. However, it is to be understood that there may instead be two sets of single bores (and, by implication, two sets of single pistons) in opposition to each other. It is to be further understood that the invention is not limited to a particular number of bores and pistons, so long as there is an arrangement whereby there are at least two pistons which oppose each other and press friction pads against the rotor 16.

The first inwardly facing surface 40 and the second inwardly facing surface 42 each have mounted thereon a heat shield 54. The heat shields 54 are manufactured from a sheet of metal which is spaced apart from the respective surfaces 40 or 42 and disposed in substantially parallel relation thereto. Each of the shields includes openings to accommodate the extension of the pistons from the bores 48. The individual heat shields 54 are spaced apart from the surfaces 40 or 42 by bosses (not shown) and which are formed upon the surfaces 40 thereby creating an insulative air gap between the heat shields 54 and the respective surfaces 40 or 42 respectively. The heat shields 54 are selected to be of an insulative material such that the heat shields 54 and the air gap between the heat shields 54 and the surfaces 40 or 42 insulate the disc brake caliper 12 from the heat produced by the pressing of the friction pad or pads 24 and 26 against the rotor 16. Preferably, the heat shields 54 are manufactured from titanium or similar materials.

The cylindrical sleeves 52 which fit within each of the bores 48A, 48B, 50A, and 50B, and which receive the individual pistons, extend beyond the heat shields 54 and into the opening 38 and then terminate in a plurality of radial slots 56. This is best viewed in FIG. 6. The radial slots 56 facilitate the venting of air in the region, thereby acting to cool the disc brake caliper 12 from the heat produced by the engagement of the friction pad or pads 24 or 26 against the rotor 16.

As seen in FIGS. 3 and 4, the third and fourth inwardly facing surfaces 44 and 46 have retainers 58 to assist in retaining the relative positions of the individual brake pad or pads 22 and 26 therebetween.

The disc-brake caliper 12 also includes a first conduit 60 which forms a part of the connective plumbing 30. As best seen in FIGS. 3 and 4, the first conduit 60 has a first end 62 and a second end 64, and is routed through and around the body 34. The ends 62 and 64 each terminate in an interconnection 66. The interconnection 66 at either the first end 62, or the second end 64, is connected to the remainder of the connective plumbing 30; the other interconnection 66 which is not connected to the connective plumbing 30 may be used to bleed the system of air. As should be understood, the selection of the specific interconnections 66 which are to be used for connection to the connective plumbing 30 and to be used for bleeding depends on which side (driver side or passenger side) of the automobile the main body 34 is mounted or upon other design considerations. The first conduit 60 conveys actuating fluid to the piston units 20 and 24 at the respective bores 48 and 50 respectively.

The outside boundary 36 of the main body 34 includes a first outside boundary portion 68, which is opposite the first inwardly facing surface 40, and a second outside boundary portion 70, which is opposite the second inwardly facing surface 42. The outside boundary 36 also includes fins 72 which are located in predetermined locations about its boundary, the fins 72 increasing the surface area of the outside boundary 36 and thereby further assisting in the cooling of the disc brake caliper 12.

The disc brake caliper 12 further includes a second conduit 74 which forms a part of the radiator system 14. The second conduit 74 is also routed through and around the housing 34 and includes a first groove 76 which is formed in the first outside boundary portion 68; a second groove 78 formed in the second outside boundary portion 70; connective piping 80; an inlet port 82; and an outlet port 84. The grooves 76 and 78 are located proximal to the first conduit 60 so as to conduct heat away from the hydraulic fluid upon forced flow of the coolant through the cooling system 14. The grooves 76 and 78 are routed in a serpentine, or back and forth, manner to increase the length of the second conduit 74 in the regions proximal to the first conduit 60. It is to be understood that there are other patterns for the grooves 76 and 78 which may be employed in the present invention and, therefore, the present invention is not intended to be restricted to the pattern as described herein. A first plate 86 is securely fitted upon the first outside boundary portion 68 and disposed in covering relationship to the first groove 76, and thereby constrains movement of the coolant within the first groove 76. Further, a second plate 88 is securely fitted upon the second outside boundary portion 70 and disposed in covering relation to the second groove 78, and thereby constrains movement of coolant within the second groove 78. Gaskets (not shown) are positioned between the first plate 86, and the first outside boundary portion 68, and between the second plate 88 and the second outside boundary portion 70, to prevent leakage of coolant to the ambient environment.

The connective piping 80 is connected so as to complete a coolant circuit between the first groove 76 and the second groove 78. In particular, a first end of the groove 76 is connected by the connective piping 80 to a first end of the groove 78, and a second end of the groove 76 is connected by the connective piping 80 to a second end of the groove 78. As noted above, the second conduit 74 further includes the inlet port 82, and the outlet port 84. The ports 82 and 84 are located upon the first plate 86 and form the entry and exit points for the fluid flow of the coolant. The ports 82 and 84 are located upon the first plate 86 and each of the ports 82 and 84 terminate in an interconnection 90.

Returning now to FIG. 1, the aforedescribed second conduit 74 (which includes the first groove 76, the second groove 78, the connective piping 80, the inlet port 82, and the outlet port 84); connective plumbing 92; pump 94; and a radiator 96 form the radiator system 14 of the present invention. More specifically the second conduit 74, the pump 94, and the radiator 96 are connected in fluid flowing relation by the connective plumbing 92 to form a fluid circuit or loop. The second conduit 74 is connected to the cooling system 14 by the interconnection 90. As should be understood, the pump 94 forces coolant to flow through the circuit such that heat is exchanged from the hydraulic fluid to the coolant in the region of the housing 34 where the first conduit 60 and the second conduit 74 are proximal, and then subsequently conveyed by the coolant to the radiator 96, where the heat is thereby transferred out of the cooling system 14 through the radiator 96 to the surrounding environment. The pump 94 maintains continuous flow through the fluid circuit.

The radiator 96 may be of any type capable of exchanging heat from the brake fluid. A smaller version of a radiator of the type such as employed in the cooling system of an automobile is suitable for use as the radiator 96. Also, a pump of the type such as used as a water pump in an automobile is suitable for use as the pump 94. It is to be understood that the invention is not restricted to any particular radiator or pump means since radiators and pumps are generally well-known and there may be any number of radiators or pump means which may be interchangeable for the purpose as herein described.

The coolant used in association with the present invention preferably has properties of high thermal conductivity. A suitable coolant for use with the present invention is Therminol® brand coolant, though it is again noted that there may be other commercially available coolants which may be used with equal success.

It should be understood that the invention is not confined to the particular construction and arrangement of parts herein illustrated and described, but embraces such modified forms thereof as come within the scope of the following claims.

What is claimed:

1. A disc brake caliper for use in an automobile having a rotor which is simultaneously rotated with a wheel hub, the caliper comprising:

(a) a housing defined by an outside boundary and wherein the housing has an opening which includes a first inwardly facing surface and a second inwardly facing surface, and wherein the housing is secured on the automobile such that the rotor is positioned in the opening, and the first inwardly facing surface and the second inwardly facing surface axially oppose each other relative to the rotation of the rotor, and wherein the housing further has a first bore located on the first inwardly facing surface and a second bore located on the second inwardly facing surface, each of the bores being adapted to receive a piston which may be activated simultaneous with the piston in the other bore to press a friction pad against the rotor and thereby clamp the rotor therebetween to provide a braking action against the rotor;

(b) a first conduit for conveying an actuating fluid to the first and the second bores, and wherein the pistons are activated upon flow of the actuating fluid directed through the first conduit; and (c) a second conduit which conveys a coolant through the housing to a region proximal the first conduit, and wherein heat is conducted away from the actuating fluid upon flow of the coolant directed through the second conduit, and wherein the second conduit includes a groove formed in the outside boundary of the housing and a plate which fits over the groove.

2. The disc brake caliper of claim 1 wherein the groove is formed in the outside boundary of the housing in the region proximal the first conduit.

3. The disc brake caliper of claim 2 and wherein the groove is routed in a serpentine fashion in the outside boundary of the housing to increase the length of the second conduit in the region proximal the first conduit.

4. The disc brake caliper of claim 1 and wherein the outside boundary includes a first outside boundary portion and a second outside boundary portion, and wherein the first outside boundary portion is positioned opposite the first inwardly facing surface, and the second boundary portion is positioned opposite the second inwardly facing surface, and wherein the second conduit further includes a first groove formed in the first boundary portion, a first plate which fits over the first groove, a second groove formed in the second boundary portion, and a second plate which fits over the second groove.

5. The disc brake caliper of claim 4 and wherein there are two regions proximal the first conduit, and the first groove is formed in the housing in a first of the two regions proximal the first conduit and the second groove is formed in the housing in a second of the two regions proximal the first conduit.

6. The disc brake caliper of claim 5 and wherein each of the grooves is routed in a serpentine-like fashion in the outside boundary of the housing to increase the length of the second conduit in the regions proximal the first conduit.

7. A disc brake caliper for use in an automobile which has a rotor and which is simultaneously rotated with a wheel hub, the caliper comprising:

(a) a housing defined by an outside boundary and wherein the housing has an opening which includes a first inwardly facing surface, and a second inwardly facing surface, and wherein the housing is adapted to be secured on the automobile such that the rotor is positioned in the opening, and the first and second inwardly facing surfaces axially oppose each other relative to the rotation of the rotor;

(b) a first conduit for conveying an actuating fluid to the housing; and (c) a second conduit which conveys a coolant through the housing to a region proximal the first conduit, whereby heat is conducted away from the actuating fluid upon flow of the coolant directed through the second conduit, and wherein the second conduit includes a groove formed in the outside boundary of the housing and a plate which fits over the groove.

8. The disc brake caliper of claim 7 and wherein the groove is formed in the outside boundary of the housing in the region proximal the first conduit.

9. The disc brake caliper of claim 8 and wherein the groove is routed in a serpentine fashion in the outside boundary of the housing to increase the length of the second conduit in the region proximal the first conduit.

* * * * *